(12) United States Patent
Olschewski et al.

(10) Patent No.: US 6,554,109 B1
(45) Date of Patent: Apr. 29, 2003

(54) ACTUATOR HAVING A CENTRAL SUPPORT, AND BRAKE CALLIPER COMPRISING SUCH ACTUATOR

(75) Inventors: Armin Herbert Emil August Olschewski, Nieuwegein (NL); Hendrikus Jan Kapaan, Nieuwegein (NL); Clair Druet, Drumettaz Clarafond (FR); Thomas Wilhelm Fucks, Aachen (DE); Manfred Antensteiner, Sierning (AT); Andries Christian Rinsma, Drachten (NL); Jiri Gurka, Behamberg (AT); Alexander Jan Carel De Vries, Tiel (NL)

(73) Assignee: SKF Engineering and Research Centre B.V., Nieuwegein (NL)

( * ) Notice: Subject to any disclaimer, the term of this patent is extended or adjusted under 35 U.S.C. 154(b) by 0 days.

(21) Appl. No.: 09/720,482
(22) PCT Filed: Jul. 7, 1999
(86) PCT No.: PCT/NL99/00427
§ 371 (c)(1), (2), (4) Date: Apr. 23, 2001
(87) PCT Pub. No.: WO00/02302
PCT Pub. Date: Jan. 13, 2000

(30) Foreign Application Priority Data
Jul. 7, 1998 (NL) .............................................. 1009584

(51) Int. Cl.⁷ .............................................. F16D 55/16
(52) U.S. Cl. ...................... 188/72.8; 188/72.1; 188/162
(58) Field of Search ................ 188/72.1, 72.7, 188/72.8, 156, 157, 158, 161, 162; 384/516, 517, 615; 74/424.81, 424.89, 89.14, 89.23, 89.34

(56) References Cited

U.S. PATENT DOCUMENTS

| | | | |
|---|---|---|---|
| 4,560,894 A | | 12/1985 | Stoll |
| 5,107,967 A | * | 4/1992 | Fujita et al. ............... 188/72.8 |
| 5,348,123 A | | 9/1994 | Takahashi et al. |
| 5,391,953 A | | 2/1995 | Van De Veen |
| 5,769,189 A | * | 6/1998 | Heibel et al. .............. 188/72.1 |
| 5,971,110 A | * | 10/1999 | Martin ....................... 188/72.8 |
| 6,158,558 A | * | 12/2000 | Bill et al. ................... 188/72.7 |
| 6,257,377 B1 | * | 7/2001 | Schumann ................. 188/72.8 |
| 6,305,508 B1 | * | 10/2001 | Schumann ................. 188/72.8 |
| 6,325,180 B1 | * | 12/2001 | De Vries et al. ........... 188/72.1 |
| 6,367,592 B1 | * | 4/2002 | Kapaan et al. ............. 188/72.8 |
| 6,367,597 B1 | * | 4/2002 | De Vries et al. ........... 188/71.9 |

FOREIGN PATENT DOCUMENTS

| | | |
|---|---|---|
| DE | 8618815 | 1/1987 |
| DE | 196 05 988 | 8/1997 |
| DE | 196 52 230 | 6/1998 |
| DE | 197 41 867 | 6/1998 |
| JP | 09053670 | 2/1997 |
| WO | WO 97/11287 | 3/1997 |
| WO | WO 97/30294 | 8/1997 |

* cited by examiner

Primary Examiner—Jack Lavinder
Assistant Examiner—Thomas J. Williams
(74) Attorney, Agent, or Firm—Oliff & Berridge, PLC

(57) ABSTRACT

An actuator (7) comprises a housing (8) which contains a screw mechanism (9) and a motor (10) which is drivably connected to the screw mechanism (9), said screw mechanism (9) providing a linear movement in response to a rotational movement of the motor (10), and comprising a screw (12) and a nut (13) one of which is supported rotatably with respect to the housing (8) by means of a rolling element bearing (25, 62). Support means (22, 61) have been provided which extend axially with respect to the screw mechanism (9), said support means (22, 61) engaging the housing (8), and supporting the screw mechanism (9) so as to take up the axial loads exerted on said screw mechanism (9).

5 Claims, 5 Drawing Sheets

ACTUATOR HAVING A CENTRAL SUPPORT, AND BRAKE CALLIPER COMPRISING SUCH ACTUATOR

Figure 1:
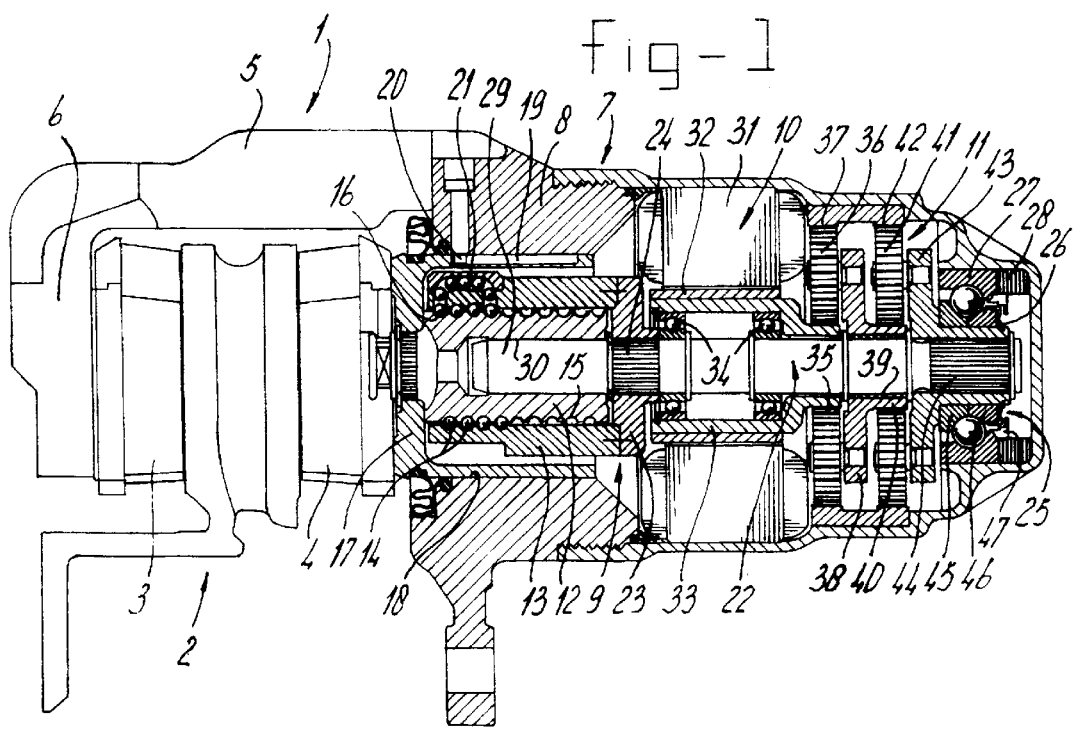

The invention is related to an actuator, comprising a housing which contains a screw mechanism and a motor which is drivably connected to the screw mechanism, said screw mechanism providing a linear movement in response to a rotational movement of the motor, and comprising a screw and a nut one of which is supported rotatably with respect to the housing by means of a bearing.

Such actuator is known from WO-A-9603301.

Having regard to the fields of application of these actuators, it is generally desired to obtain limited overall dimensions and low weight in combination with a low cost price. For instance, actuators of this kind are applicable in disc brakes for the automotive industry. A relatively low weight of the actuator is of importance with respect to minimizing the unsprung weight of a vehicle.

The object of the invention is to provide an actuator which is improved with respect to the criteria before. This object is obtained in that support means are provided which extend axially with respect to the screw mechanism, said support means engaging the housing, and supporting at least one of the screw mechanism and the motor.

The support means enable a stable positioning or centring the actuator, and provide an accurate and repeatable displacement in response to control signals. Moreover, the support means may partly or completely be accommodated within the screw mechanism, whereby the overall dimensions are reduced.

The support means as contained in the actuators according to the invention may be connected to the housing in several ways. According to a first embodiment, the support means may comprise a shaft or tube member which is stationary fixed to the housing, the rotor and one of the nut or screw being rotationally supported with respect to the shaft or tube member.

Said shaft or tube member at one end extends into the screw mechanism, and carries a support bearing at or near said end for supporting axial loads exerted on the screw mechanism.

For an improved load support function, the support bearing may be carried out as a four-point contact bearing, the loading angle of the pair of contact points which take up the axial compressive force on the screw mechanism being smaller than the other loading angle. Furthermore, the support bearing is preferably a full complement bearing.

According to a particularly preferred embodiment, the support bearing is situated within the screw mechanism. Said support bearing rotatably supports the screw of the screw mechanism.

Furthermore, the screw may be ring-shaped or sleeve-shaped, and the outer race of the support bearing may be partly of fully integrated in the inner surface of said ring-shaped or sleeve-shaped screw.

Moreover, the inner race of the support bearing may be partly or fully integrated in the shaft or tube member.

For purposes of controlling the actuator load and thus the brake force, the shaft or tube member engages the housing through a load cell. Said load cell may comprise a piezo-electric material, or a strain-gauge embedded in a foil.

According to a second, alternative embodiment the support means comprise a shaft or tube member which is rotatably connected to the housing. Said shaft or tube member is arranged for transferring a rotational movement between motor and screw mechanism. In a simple embodiment, the rotor is connected to the shaft or tube member.

The shaft or tube member is supported with respect to the housing by means of a support bearing for transferring axial forces exerted on the screw mechanism. In this case as well, the support bearing engages the housing through a load cell.

The screw may be fixed to the shaft or tube member; alternatively, the nut is fixed to the shaft or tube member.

In a preferred embodiment, the screw is axially displaceable and non-rotatable with respect to the housing, and the nut is rotatably supported with respect to the housing by means of a support bearing. Said support bearing may engage the housing through a load cell.

The motor may engage the screw mechanism through a reduction gear mechanism. Said reduction gear can be contained in a reduction gear module.

The invention is also related to a brake calliper for a disc brake, comprising a claw piece carrying two opposite brake pads between which a brake disc can be accommodated, and an actuator for displacing the brake pads towards and from each other, said actuator comprising a housing connected to the claw piece and containing a screw mechanism and a motor which is drivably connected to the screw mechanism, said screw mechanism providing a linear movement in response to a rotational movement of the motor, and comprising a screw and a nut one of which is supported rotatably with respect to the housing by means of a bearing. According to the invention, said actuator is provided with support means which extend axially with respect to the screw mechanism, said support means engaging the housing, and supporting the screw mechanism.

Several further embodiments are conceivable as well. For instance, all or some of the components of the actuator may be obtained by means of a hard turning operation, or may be coated with a diamond-like carbon coating. In this way, wear may be reduced. Also, the actuator may be lubricated and sealed for life.

The gears applied in the gear reduction may consist of a, metallic, a non-metallic or a powder material.

The drive means can be electrical, hydraulic, pneumatic or mechanically induced by e.g. a spring.

The support shaft or tube may comprise an external flange which forms a unity therewith, or which is (laser) welded, bolted, glued, soldered etcetera thereto.

The recirculating means for the balls or rollers of the ball screw mechanism (grooves, holes or tubes) may be located in the nut or the screw.

The invention will further be explained with reference to the embodiments shown in the figures.

FIGS. 1–7 show several embodiments of a brake calliper comprising an actuator according to the invention.

FIG. 1 shows a brake calliper 1 together with a part of a brake disc 2. The brake disc 2 is enclosed between two brake pads 3, 4, which are carried in a claw piece 5 of the brake calliper 1.

Brake pad 3 is fixedly connected to flange 6 of claw piece 5; brake pad 4 engages an actuator which in its entirety is indicated by reference numeral 7.

The actuator 7 comprises a housing 8 which is connected to the claw piece 5. Within said housing 8, a screw mechanism 9 has been accommodated, as well as a motor 10 and a gear reduction 11.

The screw mechanism 9 is a so-called ball screw mechanism, comprising a screw 12 and a nut 13 which engage each other by means of balls 14 accommodated in correspondingly shaped screwthreaded grooves 15, 16.

The screw 12 is fixedly connected to a piston 17, which is accommodated within a cylinder space 18 in the housing 8. Said piston 17 is axially displaceable, as will be explained below, but non-rotatable due to the engagement between the groove 19 in the piston 17, and the pin 20 in the housing 8.

The nut 13 comprises a bypass tube 21, for recirculating the balls 15 upon rotating said nut 13. Said nut 13 is rotatable but axially non-displaceable, and is connected to the support shaft 22, in particular flange 23 thereof which engages the support shaft 22 by splines 24.

The support shaft 22 is supported with respect to the housing by means of axial support bearing 25, the inner race 26 of which is connected to said support shaft 22, and the outer ring 27 of which engages the housing 8 through load cell 28.

At its opposite end, the support shaft 22 has a supporting end 29 which protrudes into bore 30 of screw 12. Screw 12 and supporting end 29 may rotate with respect to each other. They fit together so snugly however, that the nut 12 is radially supported by said protruding end 29.

The motor 10 comprises a stator 31 connected to the housing 8, and a rotor 32 connected to a supporting bush 33 which in turn, by means of deep groove ball bearings 34, is rotatably supported with respect to support shaft 22.

Support sleeve 33 comprises a first sun gear wheel 35, engaging a first set of satellite gear wheel 36. Said satellite gear wheels 36 also engage the ring gear 37.

The satellite gear wheels 36 are rotatably supported on a carrier 38, which in turn by means of plain bearing 39 is supported with respect to support shaft 22.

The carrier 38 has a second sun gear wheel 40, which engages a second set of satellite gear wheels 41 which also engage a second ring gear wheel 42.

The satellite gear wheels 41 are rotatably supported on a second carrier 43 which is fixedly connected to the support shaft 22 by means of splines 44.

Although a two-step reduction has been shown, a one-step reduction would also be possible dependent on the displacements required and the screw lead.

The inner ring 26 of the support bearing is supported on the carrier 43. Said inner ring 26 comprises two halves 45, 46, which together with outer ring 27 constitute an a-symmetrical four-point contact ball bearing.

In particular, the load angle defined by the two opposite contact points which support the axial compressive force exerted on the shaft member 22 by the brake pads 3, 4, is smaller than the other load angle.

Furthermore, the four-point contact ball bearing 25 comprises integrated sensor means 47 for measuring rotation, etcetera.

By controlling electric motor 10, a rotation of support shaft 22 is generated through the gear reduction 11. In turn, the screw 12 is rotated, as a result of which the nut 13 together with piston 17 is displaced in axial direction. Thereby, the brake pad 3, 4 are moved towards each other or away from each other, so as to cause the desired braking effect.

Figure 2:
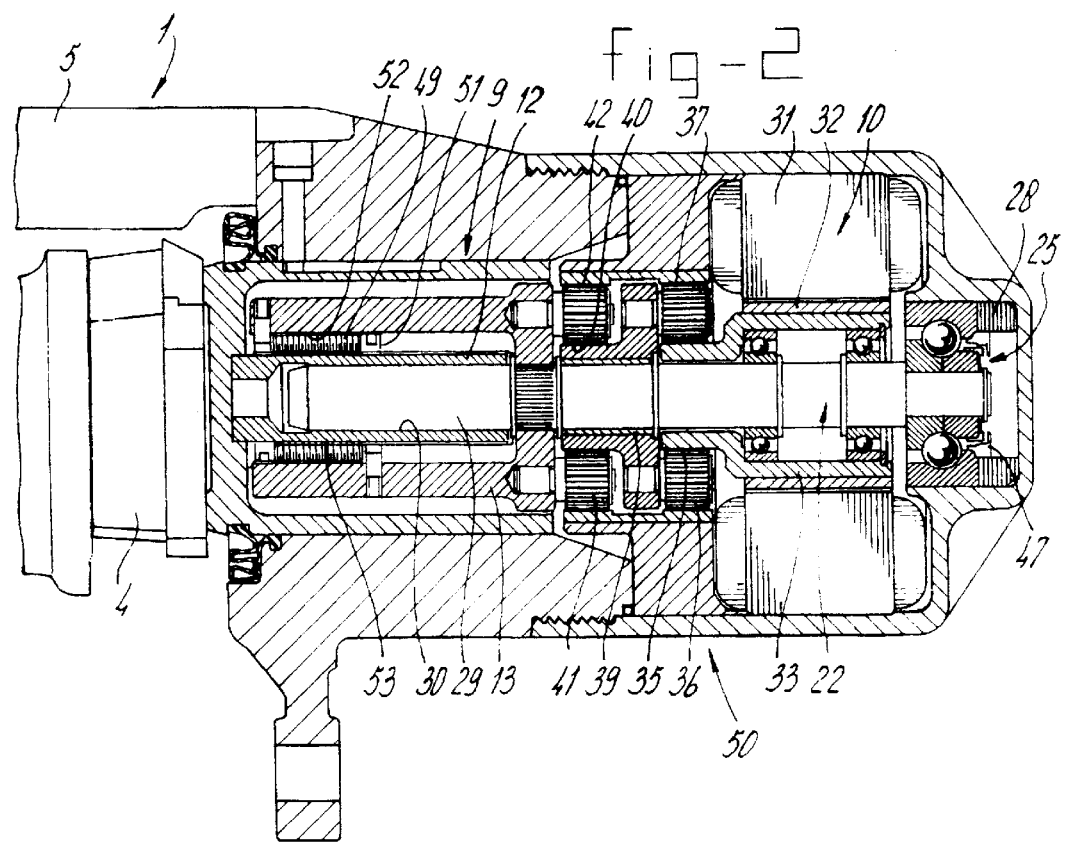

The brake calliper shown in FIG. 2 corresponds to a large extend to the one as shown in FIG. 1. However, the screw mechanism 9 now comprises rollers 49 which are contained in a cage 51. The rollers 49 engage screwthreads 52, 53 in respectively the rotating but axially non-displaceable nut 13, and in the non-rotatable but axial displaceable screw 12.

Moreover, the reduction 50 has now been situated between the motor 10 and the screw mechanism 9. The reduction 50 itself is essentially symmetrical with respect to the reduction 11 shown in FIG. 1.

Also, the support shaft 22 is almost identical to support shaft of FIG. 1.

Figure 3:
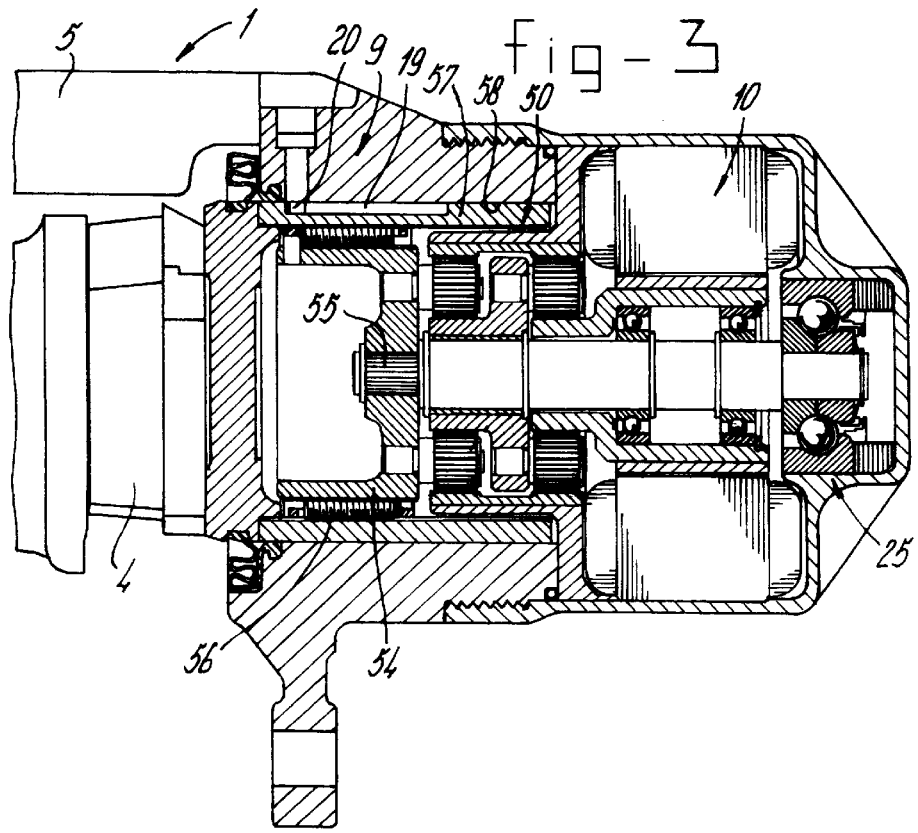

FIG. 3 shows an embodiment wherein the support shaft 22 is fixedly connected to screw 54 by means of splines 55. Through rollers 56, said screw 55 engages a nut 57 which is piston-shaped. Said nut is axially displaceable within cylinder space 58 in housing 9, but is held non-rotatably as a result of the engagement of its groove 19 with pin 20.

The reduction gear 50 can be identical to the reduction gear 50 in the embodiment of FIG. 2. By controlling the motor 10, the nut 57 is moved in axial direction for controlling the mutual distance of brake pads 3, 4.

Figure 4:
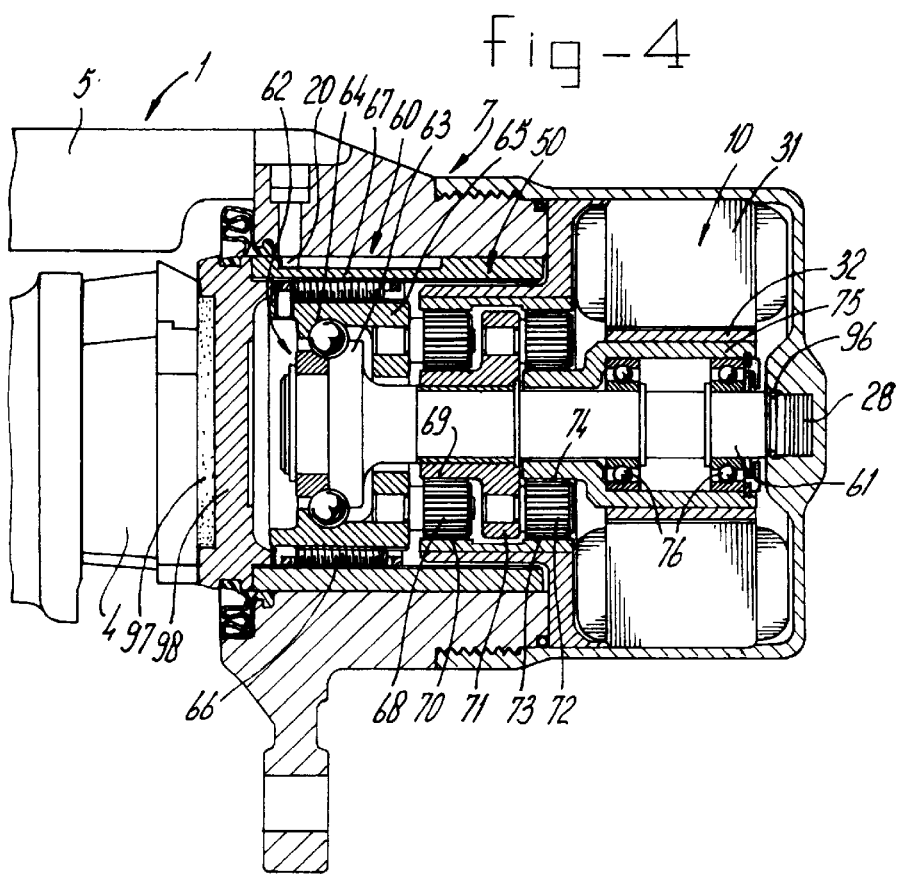

The embodiment of FIG. 4 shows a brake calliper having a motor 10, a reduction gear 50 which can be identical to the reduction of FIGS. 2 and 3, and a screw mechanism 60.

According to the invention, the support shaft 61 is fixed, both in axial and rotational direction, with respect to the housing 7. The end of support shaft 61 connected to the housing 7 is supported by a load cell 28, for measuring the axial force exerted on said support shaft 61. Said shaft 61 is locked axially in the housing 9 by means of lock ring 96, accommodated in grooves.

At its other end, the support shaft 61 protrudes into the screw mechanism 60. In particular, said end carries a partly or fully integrated four-point contact angle support bearing 62. The inner ring 63 of said support bearing 62 forms a unity with the support shaft 61; the outer ring 64 thereof is integrated in the screw 65 of screw mechanism 60.

Said screw mechanism 60 furthermore may comprise rollers 66 or balls and nut 67, which by means of groove 19 and pin 20 is axially displaceable, but non-rotatable.

The nut 67 is closed by means of a head 98, which may also form a unity with nut 67 (piston). The head 98 carries a heat-insulating ceramic disc 97.

The screw 65 carries a first set of satellite gear wheels 68, which engage a first sun gear wheel 69 as well as a first ring gear 70 connected to the housing 7. The sun gear wheel 69 is accommodated on a carrier 71, which carries the second pair of satellite gear wheels 72. Said satellite gear wheels 72 engage a second ring gear 73, as well as a second sun gear wheel 74.

Said sun gear wheel 74 is connected to a support sleeve 75, which by means of bearings 76 is rotatably supported with respect to support shaft 71.

By controlling the motor 10, the screw 65 is rotated through reduction 50. As a result, the nut 67 is moved in axial direction, thus changing the mutual spacing of brake pads 3, 4. Also, the support bearing for the motor can be equipped with sensors.

Any axial forces resulting from the contact between the brake pads 3, 4 and the brake disc 2 are carried by the four-point contact angle support bearing 62, which via support shaft 61 transfers the axial forces to the housing 7.

Figure 5:
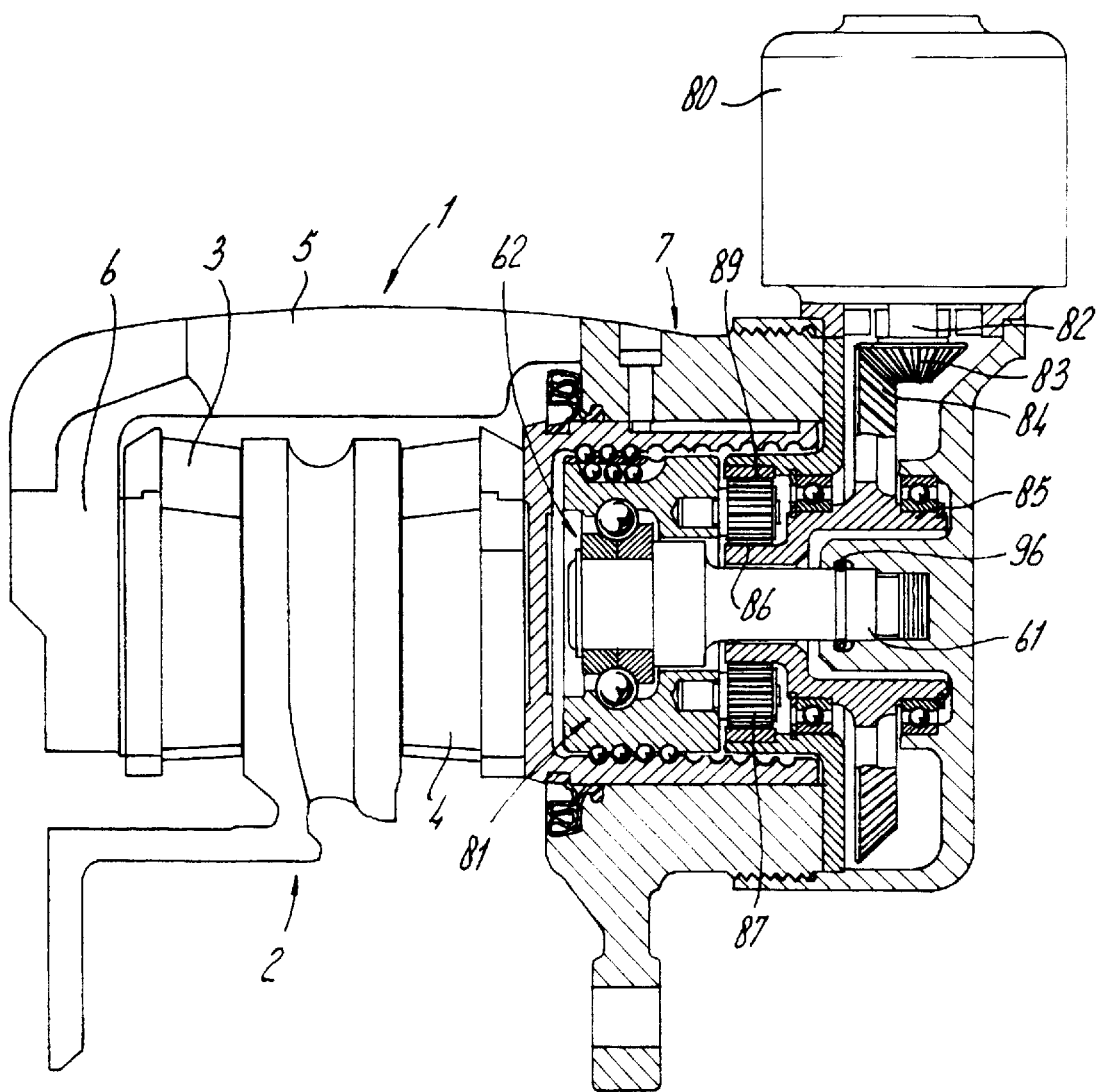

The embodiment of FIG. 5 has a motor 80 which is right-angled with respect to screw mechanism 81. Shaft 82 of motor 80 is connected to a bevel pinion 83, which in turn engages a bevel gear 84. By means of bearings 85, the bevel gear 85 is rotatably supported with respect to the housing 7.

The bevel gear 85 forms a unity with sun gear 86, which in turn via satellite gear wheels 87 and ring gear 89, drives screw mechanism 81.

Figure 6:
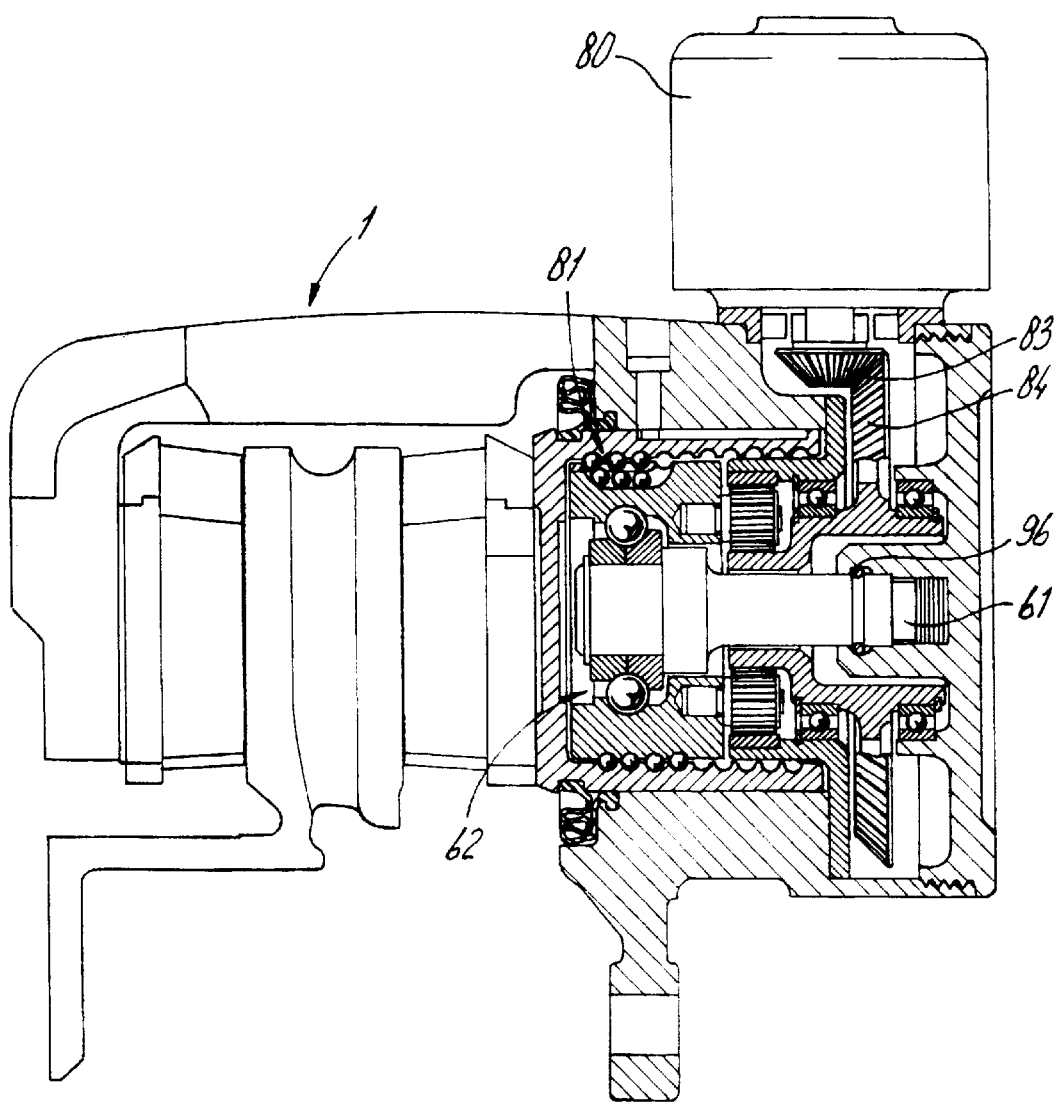

In the embodiment of FIG. 6, the bevel pinion 83 is between the bevel gear 84 and the screw mechanism 81, as a result of which a more compact brake calliper is obtained.

As indicated by the dotted lines, the four-point contact angle support bearings 62 have a-symmetrical load angles for an improved axial compressive load bearing capacity.

Figure 7:
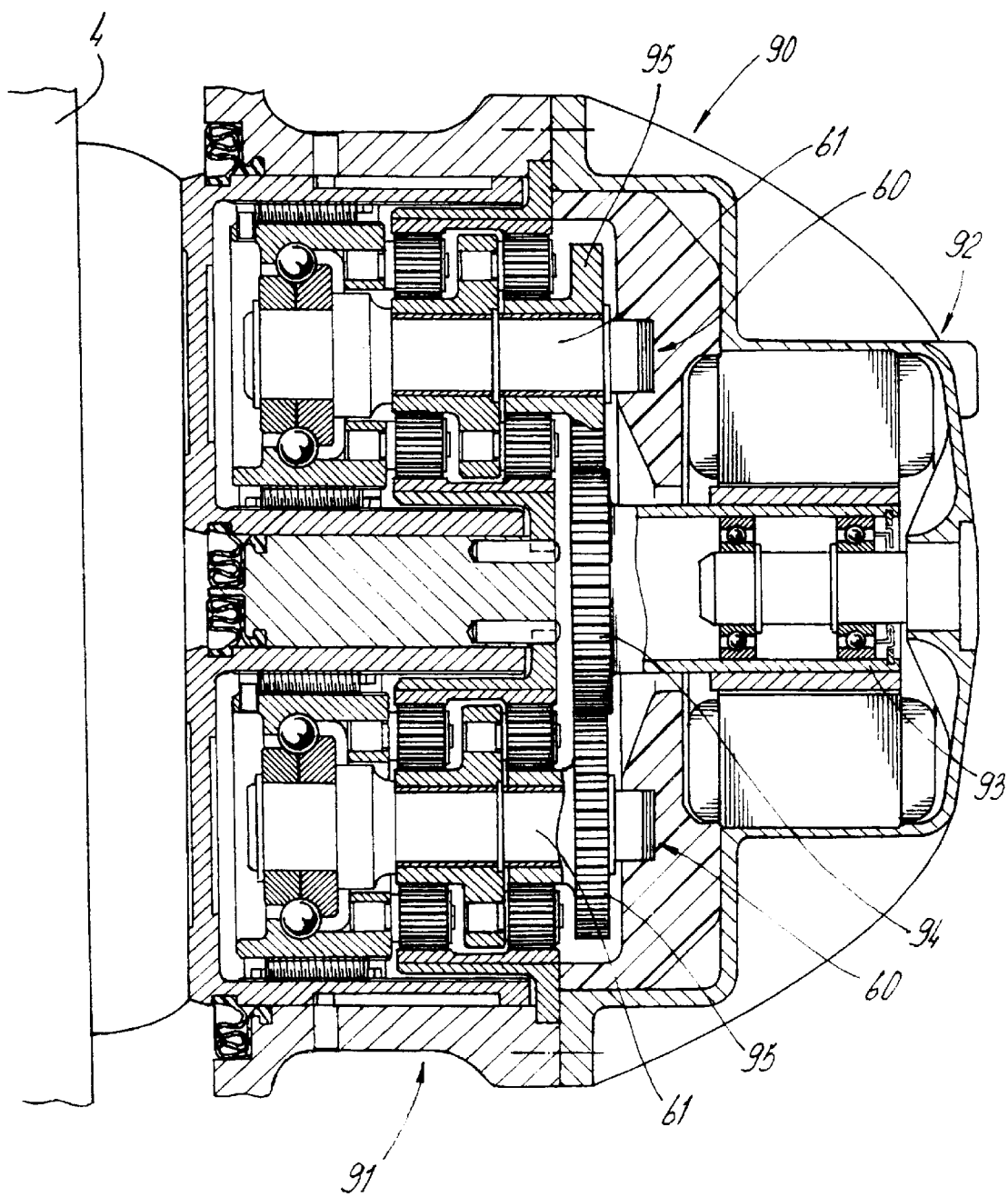

The embodiment of FIG. 7 shows a detail with part of a brake pad 4, actuated by means of two actuators 90, 91, which are both driven via a single motor 92. Said motor 92 engages a sleeve 93 having a sun wheel 94, which by means of drive gear wheels 95 drives both screw mechanisms 90, 91. Alternatively, both actuators may be provided with an own motor.

In FIGS. 1–7 the housings are fixed by threading onto the calliper. However, fixation by bolting is also possible.

What is claimed is:

1. An actuator, comprising a housing which contains a screw mechanism and a motor which is drivably connected to the screw mechanism, the screw mechanism providing a linear movement in response to a rotational movement of the motor, and comprising a screw and a nut, one of which is supported rotatably with respect to the housing by means of a rolling element bearing, and support means which extend axially with respect to the screw mechanism, the support means engaging the housing and supporting the screw mechanism so as to take up the axial loads exerted on the screw mechanism, wherein the support means comprise a shaft or tube member which is stationary fixed to the housing, one of a nut and screw being rotationally supported with respect to the shaft or tube member, and the support bearing is a four-point contact bearing, the loading angle of the pair of contact points which take up the axial compressive force of the screw mechanism being smaller than the other loading angle.

2. The actuator according to claim 1, wherein the screw is ring-shaped or sleeve-shaped, and an outer race of the support bearing is at least partly integrated in the inner surface of said ring-shaped or sleeve-shaped screw.

3. The actuator according to claim 2, wherein an inner race of the support bearing is at least partly integrated in the shaft or tube member.

4. The actuator according to any of the preceding claims, wherein the motor axis crosses or intersects the shaft member axis, the motor engaging the shaft member by means of a reduction right angle gear transmission.

5. A brake calliper for a disc brake, comprising a claw piece carrying two opposite brake pads between which a brake disc can be accommodated, and an actuator according to any of the preceding claims for displacing the brake pads towards and from each other, the actuator comprising a housing connected to the claw piece and containing one or more screw mechanisms and one or more motors which is drivably connected to the screw mechanism, the screw mechanism providing a linear movement in response to a rotational movement of the motor, and comprising a screw and a nut one of which is supported rotatably with respect to the housing by means of a bearing, wherein support means are provided which extend axially with respect to the screw mechanism, the support means engaging the housing and supporting the screw mechanism, at least two parallel screw mechanisms having been provided, each comprising the support means.

* * * * *